United States Patent Office 3,468,684
Patented Sept. 23, 1969

3,468,684
CONCRETE ADDITIVE
Wayne A. Proell, Jackson County, Ind.
(Box 209, Seymour, Ind. 47274)
No Drawing. Filed Aug. 3, 1966, Ser. No. 569,825
Int. Cl. C04b 7/56, 7/02
U.S. Cl. 106—95                                     10 Claims

ABSTRACT OF THE DISCLOSURE

An additive for cementitious mixtures capable of reducing the water-cement ratio, the thixotropy and the air entrainment of such a mixture, the additive consisting essentially of an alkyl oxydibenzenedisulfonate and the fatty acid ester of a sorbitan or the fatty acid mono ester of glycerol; and such a mixture containing said additive in a ratio, by weight, of 0.5 part to 5.0 parts additive to 100 parts cement.

---

The present invention relates to the improvement of mineral cements with respect to strength, plasticity in the freshly mixed stage, appearance, and economy of material; and while it is concerned primarily with hydraulic cement compositions such as portland cement and common concrete, it is applicable as well to grout, architectural facings, stucco, mortar, plaster of paris, magnesium, oxychloride cements and similar materials which are converted to finished form by slurrying with water and subsequent hydration. The invention comprises an additive of specific composition, as an article of commerce, as well as the improved cementitious mixtures in which that additive has been incorporated.

My improved additive comprises an organic composition of highly specific and unique nature which is added to the conventional water slurry and which improves the cementitious material as will be described in detail. In particular, it comprises a composition made of an alkyl oxydibenzenedisulfonate and the fatty acid ester of a sorbitan or the fatty acid monoester of glycerol. In one aspect of my invention, my improved additive consist of an anti-thixotropant which, when incorporated in specified proportions in a cementitious mixture, permits a radical reduction in the water/cement ratio of the mixture without deleterious reduction in a fluidity or flowability of the unset mixture. In another aspect, it consists of a disulfonate surfactant and a fatty acid ester of sorbitan or monoglyceride in a proportion sufficient to overcome, or at least to alleviate, the air entrainment characteristic of the disulfonate.

It is well known in concrete technology that the factors which regulate utility and desirable physical properties for concrete are numerous, but only a few can be altered with much freedom. Thus to prepare a reasonably economical cement or concrete, carefully sized strong aggregates, controlled cement composition, and controlled water content are needed. Some of these requirements conflict with the practical side of casting the concrete: Thus concrete is easiest to cast when it is fluid and wet, but such concrete is weak and variable in porosity after hydration (setting). Very dry concrete is strong and homogeneous, but is expensive and difficult to cast. Considerable effort is spent to make appropriate compromises to obtain good concrete, and among these is the addition of "plasticizers" or water reducers to cements and concretes. These keep the water content down while increasing the fluidity, thus increasing strength and reducing the cost of emplacing the product. The additives of this type previously known to me have been effective enough to occasion widespread use. However, none are highly effective and there have been many engineers who recommend them only where unusual difficulties are encountered. Perhaps the most effective materials in use for this purpose prior to my invention are lignosulfonates derived from wood pulping, which permit water reductions of 5 to 12%. Other substances, including sugars, hydroxyacids, and a host of chemicals showing in practice little or no useful effect are encountered in the literature for similar purposes.

I have studied these problems and have found that few if any known chemical additives change the basic nature of the cement slurry which forms the basis of all grouts, cements, and concretes. Thus whenever water content is reduced to practical levels, such as slurry water ratios of 0.5 to 0.3, the slurry exhibits that property called thixotropy. Such slurries inherently limit their own flow, because they "set" at low shear stresses or rates. While a degree of thixotropy may occasionally be advantageous, I have found that reducing the thixotropy of cement is the limiting factor in achieving useful very low water ratios and that non-thixotropic cements and slurries can be made by the proper use of my new additive.

While it is known in the art that surfactants can be used in cements, the tendency has been been to avoid their use because surfactants in general have a deleterious effect, namely air entrainment, bad effects on soundness and setting time, and erratic performance. Thus, while lignosulfonates of various types, soap detergents (alkylarylsulfonates) fatty acids, soaps, nonionics of various types, and amines have been used for various reasons, the literature shows they must be used with care and only in special circumstances; and I have been unable to discover that any unusual and desirable advantage has been noted or that the art has even considered thixotropy as a factor in examining the effects of various additives.

I have discovered a new composition, as described in general above, which permits a substantial reduction in water ratio of cementitious mixtures, while substantially destroying the thixotropy of such mixtures. The essential ingredients of this combination are (1) a salt of a dodecylated oxydibenzenedisulfonic acid; and (2) a partial fatty acid ester of a polyol, specifically the partial fatty acid esters of sorbitan or the moonesters of glycerol. Examples of the sorbitan esters are sorbitan oleate, sorbitan laurate, sorbitan trioleate, sorbitan sesquioleate, or sorbitan stearate, all selected for high lipophilic balance. Examples of the glycerol esters are glycerol mono oleate, glycerol monolaurate, glycerol monoester of tall oil fatty acids, and glycerol mono linoleate. It may be stated that the partial esters of polyols satisfactory for the present invention are a limited class, as for example the partial esters of sucrose, certain glycols, and pentaerythritol showing either no merit in that no evidence of non-thixotropy is obtained, or also showing obvious unsoundness in the set cement. None of the fatty acid derivatives show any effect within the intent of this invention when used without the alkylated oxydibenzenedisulfonic acid. It may be stated generally that the water soluble alkyl substituted oxydibenzenedisulfonates may be effectively used in the combination. Satisfactory sorbitans are available from the Atlas Powder Company of Wilmington, Del., under the commercial names "Span" and "Arlacel," while the above mentioned oxydibenzenedisulfonates are commercially available from the Dow Chemical Company of Midland, Mich. as "Benax 2A1" and "Benax 2A0." The disclosed mixture of salt and fatty acid ester may desirably be used in a quantity from 0.1% to 1.0% by weight in a cementitious mixture for most uses. For special applications such as concrete sculpture, cast stone, concrete facings, or situations in which a polished surface is desirable, the additive may be used in quantities up to approximately 4% by weight.

For most applications, the two essential ingredients of the additive may be present in equal proportions; but the useful range of those ingredients, where a relatively low concentration of additive is to be used, is from 2 parts sorbitan and 1 part Benax to 1 part sorbitan and 4 parts Benax. Where the additive is to be used in relatively high concentration, however, the useful range is from 5 parts sorbitan and 1 part Benax to 1 part sorbitan and 7 parts Benax; and I have found that, in special application, I may use proportions as low as 6 parts sorbitan and 1 part Benax and as high as 1 part sorbitan and 10 parts Benax. Similar proportions are appropriate when Benax is used with glycerol monoesters, the latter replacing the sorbitan in the ratios above. The synergetic character of the above described additive combination is strikingly demonstrated by the fact that the sorbitan alone, the glycerol monoester alone, or the Benax alone will not produce any of the desirable effects of the combination. Benax alone gives a puffy, air rich mixture when used with cement and water, the mixture having little improved fluidity as compared to the same mixture without Benax. The sorbitans alone appear to have no effect on fluidity and to produce no improvement at all in the cementitious mixture. When combined as described above, however, the essential ingredients radically affect such cementitious mixtures to produce slurries which run like water at water ratios which normally give stiff pastes, and in which slurry there is substantially no objectionable air entrainment. Such a combination is particularly useful as an additive for substantially oil-free concrete mixtures when a sorbitan derivative of high lipophilic balance is present in the additive in a proportion such as substantially to overcome the air entrainment characteristic of the disulfonate ingredient of the additive. Similarly, the combinations of glycerol monoesters of fatty acids and Benax show reduced slurry viscosity and elimination of thixotropy, while a monoester alone, for example glycerol monoleate alone, shows no anti-thixotropic effect and even increases cement stiffness.

The non-thixotropic nature of such mixtures is shown by the fact that, when poured on a level surface, they run out as a liquid and do not form a round, thick pat as do normal cements of equivalent water/cement ratios. Even with very low water contents, they form slurries which look like pastes but which flow as a liquid would do, appearing like an oily quicksand. Their flow stops when initial setting occurs, but is otherwise remarkable for such mineral rich suspensions, since a flow of the character described occurs in mixtures in which the cement content is as high as 88% by weight. The products, when set, show unusually good surface, probably due to the flow characteristics.

Not all sorbitan derivatives are equally effective, but most of them show some of the desired activity when used with the disulfonate, and those named above are generally quite effective. Some materials give a better surface finish than others, and some show better penetration when used as grouts, so no one selection is always optimum. For various uses, several choices and combinations and mixtures are therefore possible.

I have further found that these combinations can be used advantageously in practical ways, since the degree of removal of thixotropy from the cementitious mixture is controllable. Low concentrations are semi-thixotropic and set promptly, while high concentrations are especially useful in grouts, since they flow like water and finally set only after true reaction occurs. Thus in concretes, high workability and low water contents can be obtained, while in grouts, unusual penetration is possible. Used at low levels, improved plasticity is obtained with no bleeding. Thus these new and unusual materials can be used in versatile fashion to provide the cement industry with freedom to improve its products without sacrifices other than the need to incorporate the additive. I have also found that these additives are largely compatible with conventional cement modifiers, such as accelerators, retarders, lignosulfonates, and waterproofing agents such as fatty acids, so that their use is highly practical.

The effects produced by my additive far exceed those available from previously known materials, or from what might be predicted from any of the components alone, or from the usual behavior of surfactants in cements. Thus, a wide variety of conventional surfactants such as dodecylbenzene monosulfonate, lauryl sulfate, and the like show little plasticizing effect when tested. Existing data on the better known additives concerns sulfonated aldehydenaphthalene derivatives and lignosulfonates. These were tested and compared with materials disclosed herein, as shown in Table I. The test used was to dissolve or suspend the additive in water, then add water to the indicated ratio to 50 grams of cement. The cement was worked with 50 strokes of a spatula and scraped or poured into a Petri dish for setting tests. Fluidity was evaluated by visual inspection. The samples were allowed to set under 100% humidity environment, at 60–80° F., for forty-eight hours, and then evaluated for soundness and weathering resistance. A single test on plaster of paris instead of cement showed that Composition E was able to fluidize that material just like cement.

TABLE I.—NEAT CEMENT (GROUT) TESTS ON ADDITIVES

| Test No. | Additive tested (grams/50 g. cement) | Water/cement ratio (wt.) | Results |
| --- | --- | --- | --- |
| 846 | Control, no additive | 0.34 | Fluid paste. |
| 1270 | do | 0.30 | Stiff paste. |
| 711 | 0.25 g. dodecylated oxydibenzene-disulfonate sodium salt. | 0.34 | Pourable. |
| 1271 | do | 0.30 | Fluid paste. |
| 829 | 0.25 g. sorbitan sesquioleate | 0.34 | Normal paste. |
| 898 | 0.50 g. Blaticol (sulfonated alkyl-naphthalene). | 0.34 | Liquid. |
| 900 | 0.25 g. Blancol | 0.30 | Pourable on shaking (thixotropic). |
| 956 | 0.25 g. calcium lignosulfonate | 0.34 | Pourable. |
| 957 | do | 0.28 | Plastic paste, not quite pourable. |
| 981 | 0.50 g. calcium lignosulfonate | 0.28 | Just pourable but would not set. |
| 982 | 1.0 g. calcium lignosulfonate | 0.28 | Pasty; would not set. |
| 970 | 0.25 g. Marasperse lignosulfonate | 0.28 | Normal paste. |
| 963 | 0.25 g. Blancol+0.25 g. calcium lignosulfonate. | 0.28 | Thixotropic paste, not pourable. |
| 836 | 0.25 g. Composition A (cf. below) | 0.34 | Very fluid, liquid. |
| 880 | 0.25 g. Composition A | 0.28 | Liquid. |
| 1272 | do | 0.24 | Thick liquid. |
| 1002 | 1.0 g. Composition A | 0.28 | Viscous liquid, set up normally. |
| 842 | 0.375 g. Composition B | 0.24 | Very fluid liquid. |
| 843 | 0.375 g. Composition C | 0.24 | Do. |
| 1159 | 0.43 g. Composition D | 0.22 | Stiff mass; became liquid on shaking. |
| 1162 | 0.43 g. Composition D, premixed | 0.22 | Pourable thick liquid, easily fluid when vibrated. |

| Test No. | Additive tested (grams/50 g. cement) | Water/cement ratio (wt.) | Results |
|---|---|---|---|
| 1044 | 0.5 g. Composition E | 0.34 | Liquid but thixotropic |
| 1900 | 0.3 g. glycerol monooleate | 0.28 | Stiff paste. |
| 1913 | 0.25 g. Composition F | 0.24 | Just pourable, non-thixotropic. |
| 1914 | 0.25 g. Composition G | 0.24 | Pourable, moderately viscous liquid. Non-thixotropic. |

The compositions used above are as follows:

Composition A:                                              Percent
    Water _____ 25
    Dodecylated oxydibenzenedisulfonate sodium
        salt _____ 25
    Sorbitan sesquioleate _____ 50

Composition B:
    Water _____ 16.5
    Sodium salt dodecylated oxydibenzenedisulfonate _____ 16.5
    Sorbitan sesquioleate _____ 67

Composition C:
    Water _____ 33
    Sodium salt dodecylated oxydibenzenedisulfonate _____ 33
    Sorbitan sesquioleate _____ 33

Composition D:
    Water _____ 23
    Sorbitan monooleate _____ 46
    Sodium salt dodecylated oxydibenzenedisulfonate _____ 23
    9-octadecenoic acid _____ 7

Composition E:
    Water _____ 17
    Sodium salt dodecylated oxydibenzenedisulfonate _____ 17
    Sorbitan sesquioleate _____ 33
    Calcium lignosulfonate (Toranil) _____ 33

Composition F:
    Sodium salt dodecylated oxydibenzenedisulfonate _____ 60
    Glycerol monooleate _____ 40

Composition G:
    Sodium salt dodecylated oxydibenzenedisulfonate _____ 60
    Glycerol monolaurate _____ 40

Evaluating the above tests, it is evident that conventional additives, while showing an effect, are far inferior to my additive in two respects: attainable water ratio, and fluidity. With respect to water ratio, a decrease from 0.34 to 0.22 as obtained with Composition D is a decrease of 30% and even more remarkable, the products are liquid albeit viscous—unlike the normally thixotropic materials which set up instantly to weak solids where the shear stress is low. Thus a concrete mixture consisting of, by weight, 100 parts portland cement and 30 parts water, with suitable additional quantities of aggregate, can be invested with optimum flow, setting, and strength characteristics by the addition of 1 to 3 parts of my additive as described above. It might be thought that such a decrease in water content, while markedly better than that obtained with conventional additives, is still not of great practical significance, but consultation with standard concrete technological books shows that such a reduction in water content would raise the strength of a typical concrete from 6000 p.s.i. to 9000 p.s.i., a truly important improvement.

The effectiveness of the oxydibenzenedisulfonates—sorbitan esters or oxydibenzenedisulfonate—glycerol monoesters on strength is important, but the effect on fluidity is also significant. In many environments for which cementitious materials are used, a fluid slurry is applied as a grout or sealant. The fluid slurry or grout is pumped or poured into cavities, cracks, crevices, and porous spots with the plan that the cement will penetrate these and set up to consolidate and unify the material being grouted. I have found that grout which is non-thixotropic or low in thixotropy penetrates and functions far better than cements of the conventional type, even those "fluidized" by lignosulfonates, as shown in the following Table II.

TABLE II

Grouting tests

*Test method.*—Test grout is poured on the top of a column of 0.5" crushed limestone aggregate contained in a 1.25" x 10" glass tube held vertically, and open on both ends, and seated above a dish to catch effluent if any.

*Grout used.*—70 grams cement in appropriate water to make a thin slurry as indicated below.

| Grout Composition | Result of Test | Amount of Flowthrough |
|---|---|---|
| (1) Control, no additive. 70 grams cement/34 cc. water. Pourable, very fluid. | Penetrated 2 inches into column, then set up and plugged column. Middle and bottom dry. | None. |
| (2) 70 grams cement/27 cc. water. 0.7 gram calcium lignosulfonate. | Wetted column throughout | 42 grams of liquid grout flowed out; outflow weak in strength upon setting. |
| (3) 70 grams cement/22 cc. water. 0.63 gram Composition A (of Table I) as additive. | Column completely wet | 54 grams grout flowed out bottom. Set hard and strong in one day. |

The great penetration obtained with grout containing Composition A is coupled with the higher strength due to the low water-cement ratio, so that grout in case 3 was not only better in penetration, but stronger as well. The amount of outflow shows the penetration.

Concentrates modified by my additive flow better into forms, and give unusually sharp rendering of architectural detail from the mold. Polished surfaces can in fact be obtained by the use of the appropriate mold surfaces. This superior surface replication is due to the absence of thixotropy. Such surfaces also weather better than control surfaces, probably due to better water ratios.

The additive has been tested in full scale concrete tests. In a retaining wall, the concrete used was cast as a high-slump material (slump about 10") at a water content of 9 pounds per 22 pounds of cement and 210 pounds of aggregate. Four yards of such material were test cast and showed excellent flow, high strength, normal and prompt setting, and high workability. A no-fines type of aggregate concrete was also tested and the use of Composition A permitted a reduction of water from the control level of 10 pounds water/22 pounds cement to obtain adequate wetting of coarse aggregate by the slurry, to 8 pounds water/22 pounds cement in the modified slurry. The modified slurry gave a no-fines concrete also showing excellent strength.

The effects of varying the proportions of the essential ingredients of my additive, as applied to a standard cement/water grout mixture are tabulated below in Table III. In all such tests, a cementitious mixture of 50 grams cement/15 cc. water was used. This mixture is a stiff paste in the absence of additive. Arlacel was used as the sorbitan derivative and Benax 2A1 was used as the sulfonate.

TABLE III

[0.5% by weight of additive was used in each of the following tests]

| Arlacel | Benax | Paste condition |
|---|---|---|
| 6 | 1 | Stiff. |
| 5 | 1 | Slightly fluid. |
| 4 | 1 | Fluid paste. |
| 3 | 1 | Rather fluid paste. |
| 2 | 1 | Very fluid liquid, non-thixotropic. |
| 1 | 3 | Fluid, non-thixotropic. |
| 1 | 4 | Pourable, slightly thixotropic. |

[1.0% by weight of the additive was used in each of the following tests]

| 4 | 1 | Pourable, non-thixotropic. |
| 5 | 1 | Not quite liquid, slight thixotropy. |
| 1 | 6 | Fluid, just on margin of thixotropy. |

Arlacel, the Spans, and the Tweens mentioned above and herein, are all products of the Atlas Powder Company of Wilmington, Del. and their chemical structure and physical characteristics and properties are fully described in a catalogue of that company entitled "Atlas Surface Active Agents" identified "ATL CD–56 7.5M REPR. 6–53" and copyrighted in 1950. All of the Spans, with the possible exception of Span 62, are available and effective in my composition. The Tweens are not similarly effective except when used in conjunction with one or another of the Spans.

Dodecylated oxydibenzenedisulfonic acid can be purchased as Benax 2A0 or can be prepared by acidifying the sodium salt and ether extracting. I have found that this free acid may be converted into calcium, ammonium, or aluminum salts. The free acid, as well as any of those three salts, can be effectively used in place of the sodium salt in conjunction with Arlacel or other sorbitan ester or glycerol monoester in my additive.

The chemical structure of Benax may be represented as follows, though the position of the sulfonate groups in the benzene rings may vary.

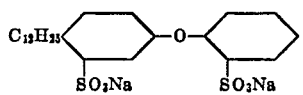

The following homologues of Benax have been synthesized by the method disclosed in U.S. Patent No. 2,081,876.

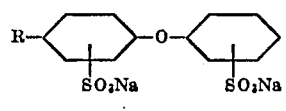

where R is as follows:

$R=C_8H_{17}$
$R=C_{12}-C_{14}$ mixture
$R=C_{15}-C_{18}$ mixture
$R=C_{16}$
$R=C_{18}-C_{20}$ mixture For the first of these synthetics, normal octanol was used as the alkylating agent and when the resulting synthetic was used in admixture with Arlacel to treat a cementitious mixture of 50 grams cement/15 cc. water, it was moderately effective to produce partial non-thixotropy.

The second synthetic was produced through the use of an alpha olefin from Chevron Corporation, consisting of a mixture of dodecylene, tridecylene, and tetradecylene; and when this synthetic was similarly used, it was found to be very effective, rendering the cement mixture liquid and easily pourable.

Cetyl alcohol was used as the alkylating agent in producing the fourth synthetic; and it was found to be ineffective as an ingredient of my additive, as was the fifth of the above listed synthetics which was prepared through the use of an alpha olefin consisting of a mixture of octadecylene, nonadecylene, and eikosylene.

I claim as my invention:

1. As an anti-thixotropant additive for cementitious mixtures, an oxydibenzenedisulfonate substituted with an alkyl group containing 8 to 15 carbon atoms; together with at least one partial fatty acid ester of a polyalcohol selected from the group consisting of the partial fatty acid esters of sorbitan and the mono esters of glycerol; the partial fatty acid ester being present in the additive in proportion to the sulfonate in the range between 6:1 and 1:10.

2. The additive defined in claim 1 in which the sulfonate is selected from the group consisting of dodecylated oxydibenzenedisulfonic acid and its sodium calcium, ammonium and aluminum salts.

3. The additive defined in claim 1 in which the sulfonate is a water soluble disulfonate.

4. A water-requirement-reducing additive for concrete mixtures consisting essentially of a sorbitan derivative of high lipophilic balance from 6 to 1 parts and dodecylated oxydibenzenedisulfonate from 1 to 10 parts.

5. A water-requirement-reducing additive for concrete mixtures consisting essentially of a mono fatty acid ester of glycerol from 6 to 1 parts and dodecylated oxydibenzenedisulfonate from 1 to 10 parts.

6. An additive for substantially oil-free concrete mixtures, said additive consisting essentially of an oxydibenzenedisulfonate substituted with an alkyl group containing 8 to 15 carbon atoms and a sorbitan derivative of high lipophilic balance, the sorbitan derivative being present in the additive in proportion to the sulfonate in a quantity sufficient substantially to overcome the air entrainment characteristic of the sulfonate.

7. An additive for substantially oil-free concrete mixtures, said additive consisting essentially of an oxydibenzenedisulfonate substituted with an alkyl group containing 8 to 15 carbon atoms and a glycerol monoester of a fatty acid, the glycerol monoester being present in the additive in a quantity sufficient substantially to overcome the air entrainment characteristic of the sulfonate.

8. A concrete mixture comprising, by weight, 100 parts portland cement, 20–50 parts of water, 0–900 parts of a suitable aggregate, and 2 to 5 parts of an additive as defined in claim 1.

9. A concrete mixture comprising by weight, 100 parts portland cement, 20–50 parts of water, 0–900 parts of a suitable aggregate, and 1 part of an additive as defined in claim 1 in which the glycerol is glycerol monoester and the selected partial fatty acid ester of a polyalcohol is present in the additive in proportion to the sulfonate in the range between 5:1 and 1:7.

10. A concrete mixture comprising, by weight, 100 parts portland cement, 20–50 parts water, and 0.5 part of additive as defined in claim 1 in which the partial fatty acid ester of a polyalcohol is present in the additive in proportion to the sulfonate in the range between 2:1 and 1:4.

References Cited

UNITED STATES PATENTS

| | | | |
|---|---|---|---|
| 3,369,915 | 2/1968 | Lee | 106—111 |
| 3,351,478 | 11/1967 | Dodson et al. | 106—90 |
| 3,215,548 | 11/1965 | Vollick | 106—90 |
| 3,053,673 | 9/1962 | Walker | 106—90 |

TOBIAS E. LEVOW, Primary Examiner

W. T. SCOTT, Assistant Examiner

U.S. Cl. X.R.

106—90, 107, 314